US008428384B2

United States Patent
Bae et al.

(10) Patent No.: US 8,428,384 B2
(45) Date of Patent: Apr. 23, 2013

(54) METHOD AND APPARATUS FOR PERFORMING AN IN-PAINTING PROCESS ON AN IMAGE

(75) Inventors: Soo Hyun Bae, San Jose, CA (US); Farhan Baqai, Fremont, CA (US)

(73) Assignee: Sony Corporation, Minato-Ku, Tokyo (JP)

( * ) Notice: Subject to any disclaimer, the term of this patent is extended or adjusted under 35 U.S.C. 154(b) by 337 days.

(21) Appl. No.: 12/806,786

(22) Filed: Aug. 19, 2010

(65) Prior Publication Data

US 2012/0045128 A1 Feb. 23, 2012

(51) Int. Cl.
*G06K 9/40* (2006.01)
*G06K 9/00* (2006.01)

(52) U.S. Cl.
USPC .......................................... 382/254; 382/162

(58) Field of Classification Search ........................ None
See application file for complete search history.

(56) References Cited

U.S. PATENT DOCUMENTS

| | | | |
|---|---|---|---|
| 6,587,592 B2 | 7/2003 | Georgiev et al. | |
| 6,987,520 B2 | 1/2006 | Criminisi et al. | |
| 7,012,624 B2 * | 3/2006 | Zhu et al. ...................... | 345/639 |
| 7,418,131 B2 | 8/2008 | Wang et al. | |
| 7,502,521 B2 * | 3/2009 | Sun et al. ...................... | 382/254 |
| 7,755,645 B2 * | 7/2010 | Sun et al. ...................... | 345/634 |
| 7,840,086 B2 * | 11/2010 | Bertozzi et al. ............... | 382/254 |
| 8,041,140 B1 * | 10/2011 | Georgiev ...................... | 382/254 |
| 8,073,277 B2 * | 12/2011 | Huan et al. ................... | 382/254 |
| 8,144,161 B2 * | 3/2012 | Ndjiki-Nya .................. | 345/582 |

FOREIGN PATENT DOCUMENTS

WO WO 2008/004903 A1 1/2008

OTHER PUBLICATIONS

Criminisi, A. Perez, P. ; Toyama, K. "Region filling and object removal by exemplar-based image inpainting", IEEE Transactions on Image Processing, vol. 13, issue 9, 2004.*
"Video Inpainting and Implant Via Diversified Temporal Continuations", Timothy K. Shih, Nick C. Tang, Wei-Sung Yeh, Ta-Jen Chen, Wonjun Lee, Oct. 2006, pp. 133-136.
"Digital Inpainting—Image Inpainting, Video Inpainting, Holes Removal on 3-D Surfaces" Timothy K. Shih, Rong-Chi Chang, Su-Mei Chou, Yu-Ping Chen, Huan-Chi Huang, 5 pages, no date.

* cited by examiner

*Primary Examiner* — Li Liu
(74) *Attorney, Agent, or Firm* — Moser Taboada

(57) ABSTRACT

A method and apparatus of in-painting an image using prioritized graph cut optimization is disclosed. In one embodiment, the method includes examining an image comprising a plurality of pixels that form a source region and a target region, wherein the source region comprises pixel information partitioning the source region into blocks, defining boundary areas comprising a portion of the source region and a portion of the target region, computing a plurality of energy values for the source region and the boundary areas, wherein energy values represent intensity comparisons between the boundary areas and neighboring blocks of the source region and assigning labels to the boundary areas using on a graph-cut technique, wherein each label is associated with a neighboring block and an minimal energy value for each boundary area and storing pixel information based on the pixel information of the neighboring blocks associated with the minimal energy values.

20 Claims, 7 Drawing Sheets

METHOD AND APPARATUS FOR PERFORMING AN IN-PAINTING PROCESS ON AN IMAGE

BACKGROUND

1. Field of the Invention

Embodiments of the present invention generally relate to an image processing system and, more particularly, to a method and apparatus for performing an in-painting process on an image using prioritized graph cut optimization.

2. Description of the Related Art

Conventional computer-based image processing systems utilize various computer-vision principles and techniques, such as patch (block)-based in-painting and exemplar-based in-painting processes, to restore and/or otherwise improve images. These images may be damaged or include missing portions. Accordingly, the image processing systems modify pixels to improve visual quality, restore damaged portions and replace any missing regions.

These processes, however, are iterative solutions that divide an image into a plurality of blocks (e.g., eight×eight pixels, sixteen×sixteen pixels and the like) and operate on a block-by-block basis to perform in-painting. Basically, the typical process in-paints individual blocks and not groups of blocks. In other words, such techniques do not efficiently and accurately identify the best labels for multiple blocks to be in-painted during a single iteration. Labels generally translate into one or more intensity values where each value represents an amount or strength of at least one color component as displayed in one or more pixels (i.e., a block of pixels). Instead, these techniques assign labels one block at a time. While a label may be optimal for a certain block, the label is not optimal for the multiple blocks. Accordingly, errors often result from performing the in-painting process on the block-by-block basis. Erroneous labels are used in subsequent iterations resulting in propagation of the errors throughout the entire in-painting process. As a result, typical in-painting processes operate very slowly and inefficiently.

In addition, these processes employ various optimization (i.e., minimization) techniques to solve an in-painting problem by finding the best labels. Such optimization techniques evaluate pixel information of an image and assign labels to whole blocks of pixels. Each label represents an approximate intensity value for each and every pixel within the block. Therefore, instead of examining an intensity value for each primary color component of each pixel, these optimization techniques process labels that represent multiple intensity values for an entire block of pixels. Unfortunately, there are numerous potential labels for the pixels in the image. Because of the large number of labels (intensity values), executing any of these optimization techniques requires significant processing power. For example, implementing a graph-cut minimization technique for an image having more than two labels (for non-binary labeling in a non-binary image) is very complex and NP-hard (non-deterministic polynomial-time hard).

Therefore, there exists a need for a method and apparatus to perform an in-painting process on an image using a prioritized graph cut optimization technique.

SUMMARY

Various embodiments comprise a method and apparatus of in-painting an image using prioritized graph cut optimization. In one embodiment, the method includes examining an image comprising a plurality of pixels that form a source region and a target region, wherein the source region comprises pixel information partitioning the source region into blocks. The method further includes defining a plurality of boundary areas comprising a portion of the source region and a portion of the target region and examining a plurality of energy values for the source region and the boundary areas, wherein energy values represent intensity comparisons between the boundary areas and neighboring blocks of the source region. The method further includes assigning intensity values to the boundary areas using on a graph-cut technique, wherein each intensity value is associated with a neighboring block and a minimal energy value for each boundary area, and storing pixel information for the boundary areas based on the pixel information of the neighboring blocks associated with the minimal energy values.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
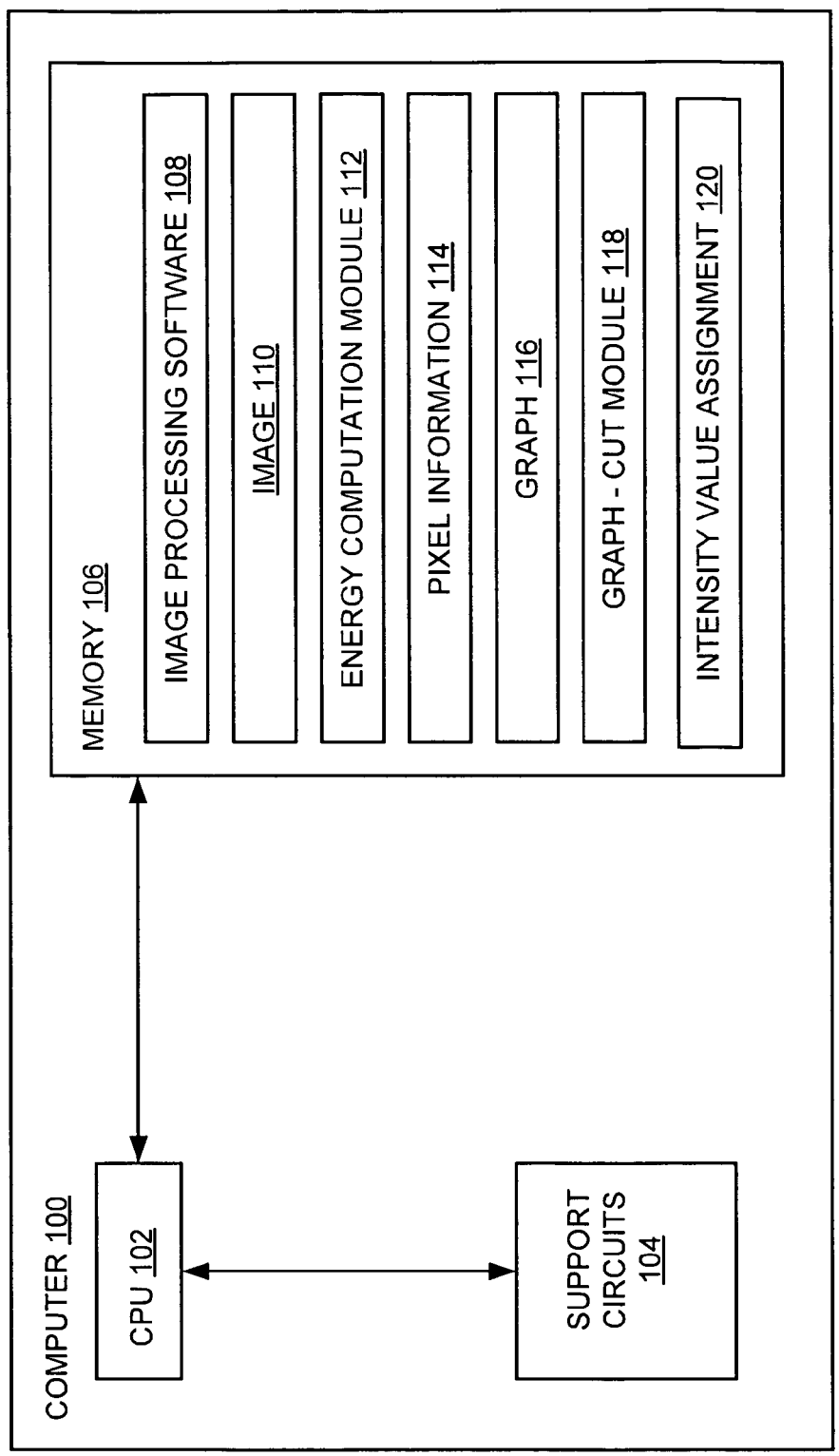
FIG. 1 illustrates a computing system for performing an in-painting process on an image in accordance with at least one embodiment.

FIG. 1 illustrates a computing system 100 for performing an in-painting process on an image through prioritized graph cut optimization in accordance with at least one embodiment. The computing system 100 is a type of computing device (e.g., a laptop, a desktop, a server, a mobile device, a multimedia recording device and/or the like) that comprises a Central Processing Unit (CPU) 102, support circuits 104, a memory 106, image processing software 108, an image 110, an energy computation module 112, pixel information 114, a graph 116, a graph-cut module 118 and a label assignment 120.

The CPU 102 comprises one or more commercially available microprocessors or microcontrollers that facilitate data processing and storage. The support circuits 104 facilitate operation of the CPU 102 and include clock circuits, buses, power supplies, input/output circuits and/or the like. The memory 106 includes a read only memory, random access memory, disk drive storage, optical storage, removable storage, and the like. The memory 106 further includes various software packages, such as the image processing component 108, the energy computation module 112, the graph-cut module 118 and the image processing software 108. The memory 106 further stores various data, such as the image 110, the pixel information 114 and the graph 116.

The image processing software 108 includes software code (processor executable instructions) for solving an in-painting problem for the image 110. For example, the image 110 may include pixel blocks in need of restoration. The image processing software 108 utilizes the energy computations module 112 and the graph-cut module 118 to perform prioritized graph-cut optimization as explained further below. The image 110 is partitioned into smaller regions where a global minimization problem of image in-painting is converted to a local minimization problem. Thus, the in-painting module is configured to in-paint multiple blocks instead of one block that enables the evaluation of visual association of multiple blocks with the background as in the image 110.

The pixel information 114 maintains color, texture and/or scene information for the image 110. The pixel information 114, for example, may include a two-dimensional representation of the image 110 where each pixel is associated with one or more intensity values indicating a relative strength of one or more corresponding color components. The pixel information 114 may also include depth values reflecting distance and opacity of the each pixel. In some embodiments, the pixel information 114 includes a five-component representation for each pixel. Such a representation can be expressed as an image processing tensor that includes at least a single dimensional image processing matrix (i.e., vector) for at least a two-dimensional image. An exemplary embodiment of such a matrix is as follows:

$$\begin{bmatrix} x_1 \\ x_2 \\ x_3 \\ \partial_h x \\ \partial_v x \end{bmatrix}$$

This image processing matrix includes primary color components $[x_1, x_2, x_3]$ for the image 110, $\partial_h x$ (i.e., the product of partial derivative along a horizontal direction and a normalization of the primary color components) and $\partial_v x$ (i.e., the product of partial derivative along a vertical direction and a normalization factor of the primary color components). $x_1$, $x_2$ and $x_3$ are intensity values for the primary color components (e.g., red, green, blue (RGB) components), where each intensity value represents an amount or saturation of a particular color in the pixel. For example, if the pixel information 114 includes a full or strong intensity for each primary color component, the image 110 appears completely white. In addition, an intensity value for a block of pixels may be approximated or computed without examining the intensity values for each pixel. Comparisons between the approximate intensity value and actual intensity values affect a global energy of the image 110 as described further below.

The energy computation module 112 includes software code (processor executable instructions) for producing energy values for the image 110 boundary areas as explained below. The energy computation module 112 computes data costs between the boundary areas and the neighboring blocks using one or more intensity values (i.e., labels). The data cost relates to a directional information of a block of pixels within the image 110. The energy computation module 112 computes a smoothness cost associated with assigning a same intensity value (i.e., a same label) to a pair of the neighboring blocks. In some embodiments, smoothness costs using a top-down label assignment are differentiated from a left-right label assignment. The energy values represent intensity comparisons between the neighboring blocks and the boundary areas.

When the image 110 is transformed into a graph-cut structure for minimizing global energy, each vertice $v_i$ in a set V is a block of pixels and each edge in a set E represents two neighboring blocks $(v_i, v_j)$. Generally, by assuming Markov random field prior, we define the global energy as:

$$E(X) = \sum_{v_i \in V} E_1(v_i) + \lambda \sum_{(v_i, v_j) \in E} E_2(v_i, v_j)$$

Generally, $E_1$ encodes a data cost or the similarity of an $i^{th}$ neighboring block $(v_i)$ for a boundary area. $E_2$ implements a smoothness cost or the similarity between the neighboring block $(v_i)$ and another neighboring block $(v_j)$ (e.g., an adjoining neighboring block) for the boundary area, where $\lambda$ is a tuning parameter. By minimizing the global energy using a graph-cut technique, an optimal or most-optimal label assignment 120 (i.e., intensity values) is determined as explained further below with respect to FIGS. 5 and 6A-B.

The graph 116 is a graph-cut representation of the image X having a source region and a target region where the intensity values (i.e., labels) can be assigned using prioritized graph-cut optimization. According to various embodiments, the graph-cut module 118 facilitates the prioritized graph-cut optimization by performing a max-flow/min-cut operation on the graph 116. An underlying principle of the prioritized graph-cut optimization is that an optimal or most-optimal solution (i.e., a label for a boundary area) should exist in a neighboring block the source region and target region. The prioritized graph-cut technique disregards blocks beyond a predefined distance. As such, the neighboring blocks are prioritized based on distance from the boundary areas.

After the image processing software 108 initializes blocks of the image 110 with labels (i.e., approximate intensity values for an entire block), the image processing software 108 utilizes the graph-cut module 118 to determine an optimal label assignment 120 for the image 110. Basically, the image processing software 108 uses the approximate intensity values for whole neighboring blocks to identify those neighboring blocks that best match the boundary areas. Then, the image processing software 108 copies actual intensity values from the matching neighboring blocks to the pixel information 114 for the boundary areas according to one or more embodiments.

After the image processing software 108 identify damaged images (e.g., scratched photos), the image processing software 108 may restore or repair any portion thereof based on the pixel information 114 from the matching neighboring blocks. The image processing software 108 may also identify undesired objects within the image 110. These objects are removed from the image 110 and replaced with the pixel information 114 of the matching neighboring blocks. In other embodiments, the image processing software 108 may add objects to the image 110 and/or move objects to another location within the image 110.

Figure 2:
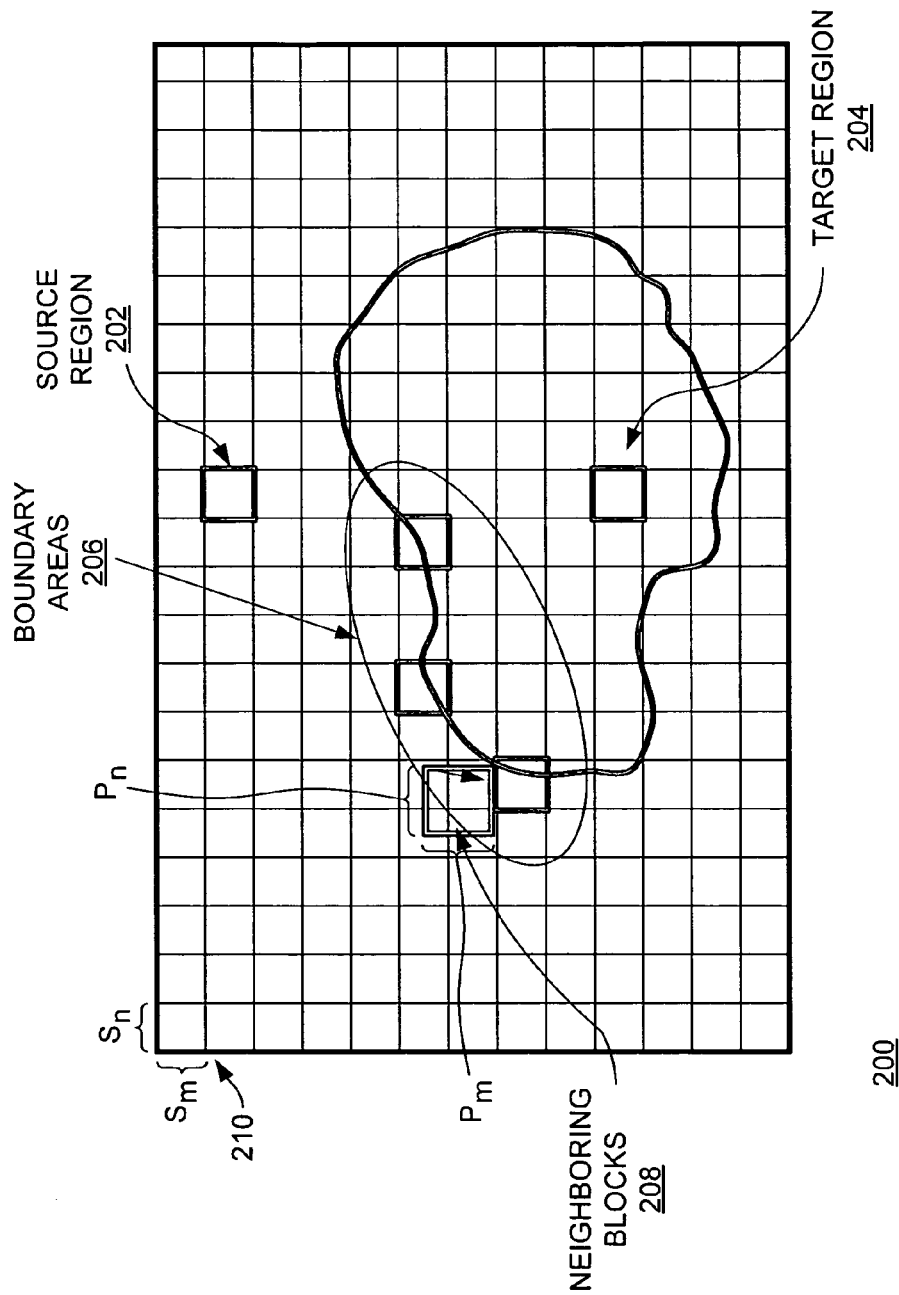
FIG. 2 illustrates a schematic of an image to be in-painted in accordance with at least one embodiment.

FIG. 2 illustrates a schematic depicting an image 200 comprising a source region 202, a target region 204 and boundary areas 206 according to one or more embodiments. The source region 202 includes blocks of pixels that include pixel information. The target region 204 also includes blocks of pixels, but these blocks may include no and/or incorrect pixel information (i.e., the target region 204 is a portion of the image 200 being in-painted using pixel information from the source region 202). The boundary areas 206 includes pixels from the source region 202 and the target region 204, where each boundary area 206 overlaps a portion of the source region 202 and a portion of the target region 204. As such, the boundary areas 206 include only the pixel information provided by the overlapping portions of the source region 202 according to one or more embodiments.

The image 200 further includes neighboring blocks 208 for the boundary areas 206. As shown below in FIG. 6A-B, intensity values associated with the neighboring blocks 208 are used to determine an optimal label (i.e., approximate intensity value) for each of the boundary areas 206. The optimal labels are associated with minimal energy values for the source region 202 and the boundary areas 206. The intensity values of the neighboring blocks 208 are prioritized and/or weighted according to a distance between each center pixel to a center pixel of each of the boundary areas 206. Between two or more neighboring blocks 208, for example, a lower priority (i.e., weight) is assigned to the neighboring block 208 that is further way from a certain boundary area 206. In some embodiments, only neighboring blocks 208 that are within eight or less pixels from the pixel center of the certain boundary area 206 are used as candidates for the prioritized graph-cut optimization as described further below.

Thereafter, at least one of the neighboring blocks is identified that is associated with a minimal energy value of the plurality of energy values for the boundary areas according to a prioritized graph cut minimization technique, where the minimal energy value represents an minimal disagreement between the intensity values of boundary areas and the neighboring blocks. The neighboring block 208 is an image patch having a patch size $p_m \times p_n$. At each sampling instance ($s_m \times s_n$) patches are cropped and at each in-painting iteration, a best match for the boundary areas 206 is located in the source region 202 until the target region 204 is completely in-painted.

Figure 3:
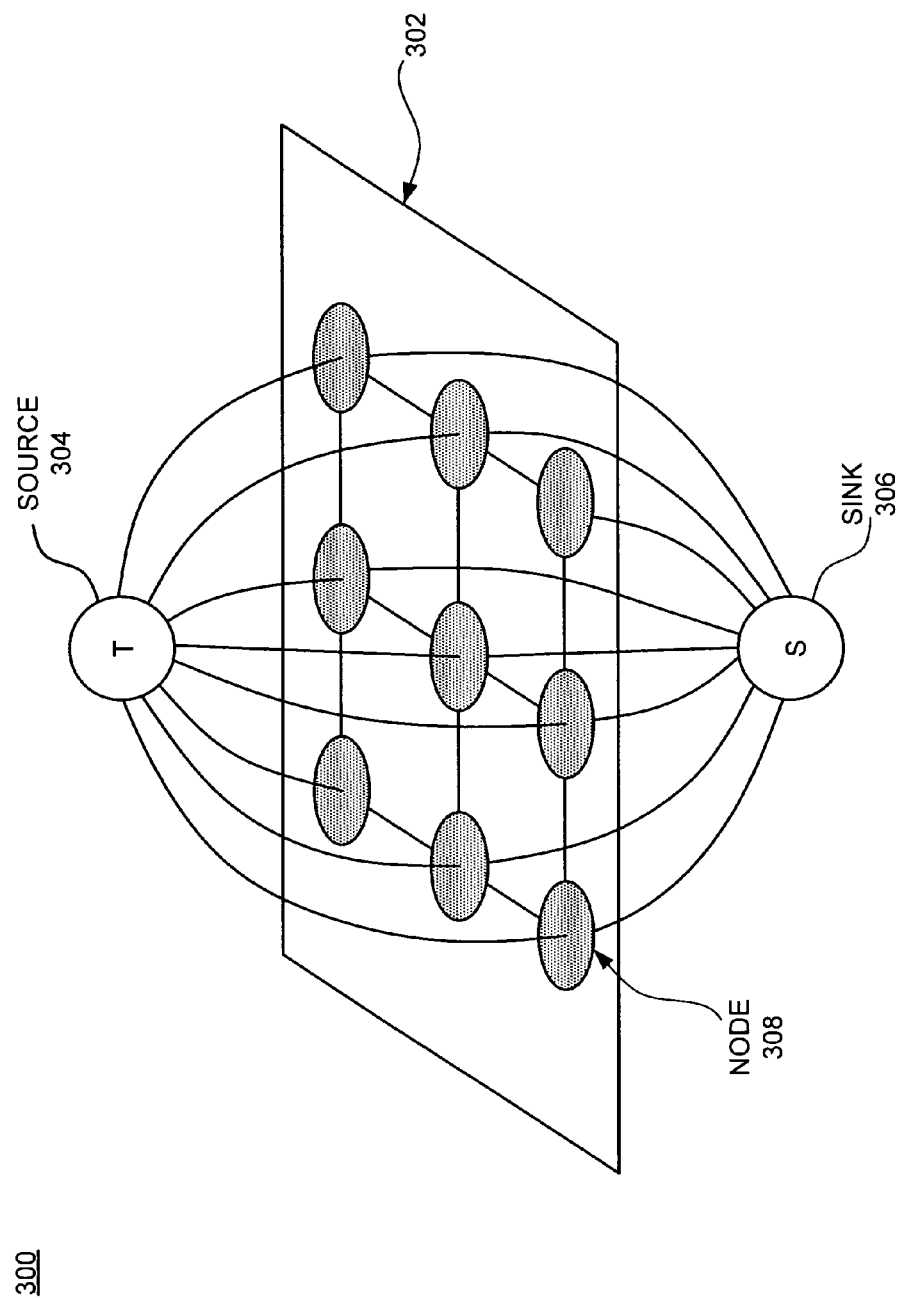
FIG. 3 illustrates a graph-cut representation of an image to be in-painted in accordance with at least one embodiment.

FIG. 3 illustrates a graph 300 that represents a graph-cut structure of an image 302 to be in-painted according to one or more embodiments of the present invention. The graph 300 includes a source 304 and a sink 306, which represent potential intensity values (e.g., labels) for assignment to a source region and boundary areas of the image 302. The graph 300 further includes nodes 308 that represent portions (i.e., blocks of pixels, such an eight pixel by eight pixel block) of the source region and the boundary areas.

The prioritized graph-cut optimization involves alternate execution of a label assignment expansion procedure (e.g., as show in FIG. 6A) and/or a label assignment swap procedure (e.g., as show in FIG. 6B), where each procedure uses a graph-cut technique to identify a minimum cut of the graph 300. The minimum cut refers to an assignment of one or more intensity values that are associated with minimal energy values for the source region and the boundary areas. In some embodiments, these procedures are alternately executed in order to converge upon an optimal label assignment for the boundary areas.

In an expansion operation, the image processing software modifies labels (e.g., approximate intensity values) for one or more nodes 308 (e.g., blocks of pixels in the source region, boundary areas and/or the target region) that border other nodes 308 assigned the label a. In some embodiments, the labels are replaced with label a. In the graph 300, the source 304 may be labeled a to represent a particular intensity value (e.g., an approximate intensity value for all pixels or an actual intensity value of a member pixel) associated with a particular neighboring block (i.e., a candidate patch) and the sink 306 may be labeled ¬a to represent each and every other intensity value associated with the neighboring blocks. Each edge (i.e., link) between the node 308 and another node 308 represents a smoothness cost associated with assigning the intensity value for a to adjoining nodes 308. Each edge between the node 308 and either the source 304 or the sink 306 represents a data cost associated with assigning either a or ¬a, respectively, to the node 308. After the graph-cut technique is applied, the image 302 is segmented into one or more nodes 308 that are associated with minimal energy values when assigned the intensity value of a. Any remaining nodes 308 are not be assigned the same intensity value of a. In some embodiments, the remaining nodes 308 retain their initial label assignment. The expansion operation is repeated for each potential (i.e., priority) intensity value of the neighboring blocks until an optimal a is determined that results in global minimal energy values.

In a swap operation, the image processing software replaces a label (e.g., approximate intensity values) for one or more nodes 308 (e.g., blocks of pixels in the source region, boundary areas and/or the target region) with another label. In some embodiments, the one or more nodes 308 labeled a are now labeled β. In the graph 300, the source 304 may be labeled a to represent an intensity value (e.g., an approximate intensity value for all pixels or an actual intensity value of a member pixel) of a particular neighboring block (i.e., a candidate patch) and the sink 306 may be labeled β to represent another intensity value associated with another neighboring block. In some embodiments, the source 304 may be labeled with the optimal intensity value determined by the previous expansion operation. Similarly, each edge (i.e., link) between the node 308 and another node 308 represents the smoothness cost associated with assigning the intensity value for a and/or β to the two adjoining nodes 308. Each edge between the node 308 and either the source 304 or the sink 306 represents the data cost associated with assigning either a or β, respectively, to the node 308. The intensity value swap procedure applies the graph-cut technique to each and every combination of intensity values for a and β until an optimal a and/or β is determined that results in the global minimal energy values for the image 302.

It is appreciated that, in alternative embodiments, the prioritized graph cut optimization described below may be performed on the image 302 using numerous labels. The image is partitioned into a number of layers that equals the number of labels. Hence, in a graph that is configured for n labels, a sink is connected to a source through numerous nodes arranged across n layers.

Figure 4:
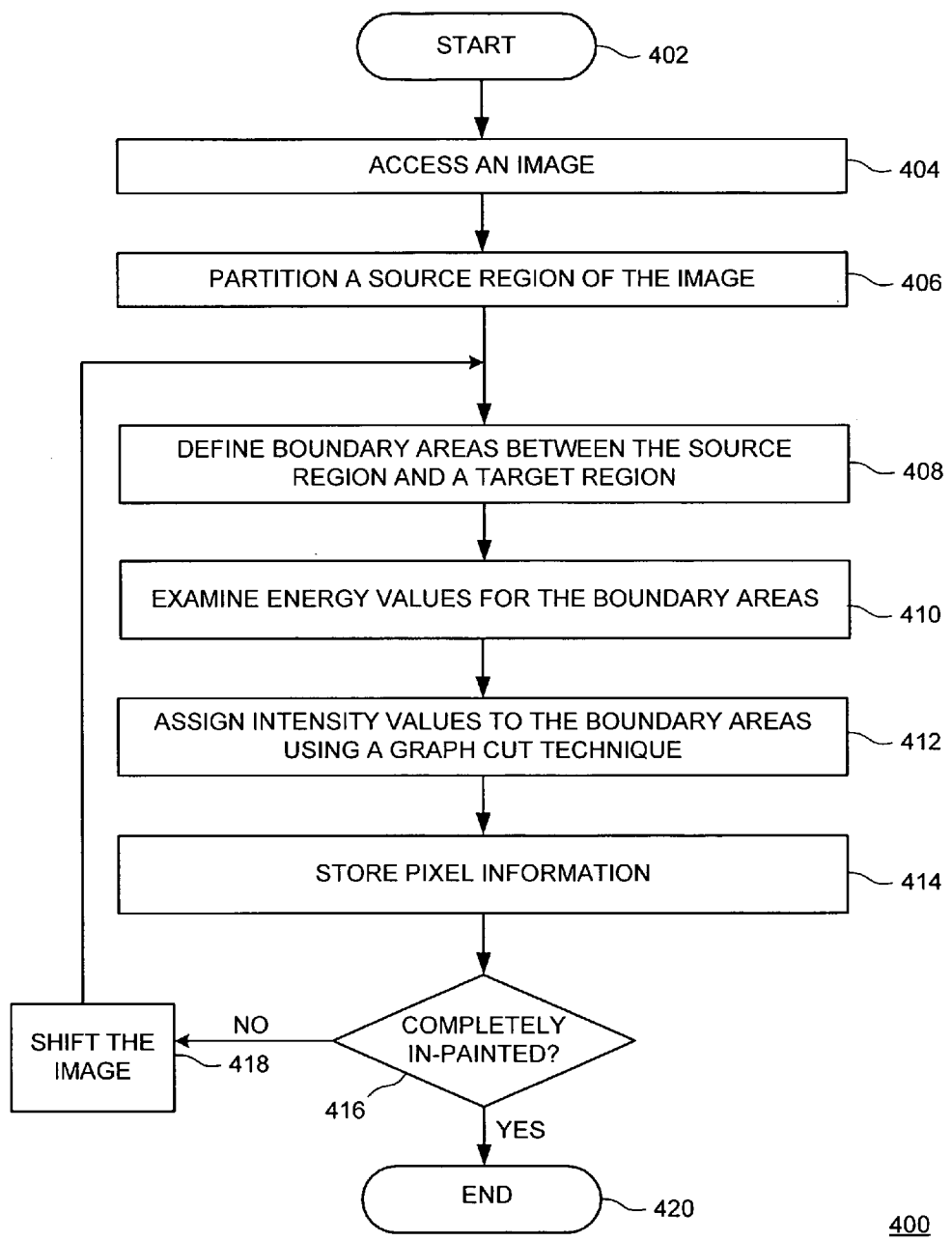
FIG. 4 illustrates a flow diagram of a method for performing an in-painting process on an image using a graph-cut technique in accordance with at least one embodiment.

FIG. 4 is a flow chart illustrating a method 400 for in-painting an image by prioritized graph cut optimization technique according to one or more embodiment of the present invention.

The method 400 starts at step 402 and proceeds to step 404. At step 402, the image is accessed. In some embodiments, image processing software (e.g., the image processing software 108 of FIG. 1) examines the image (e.g., the image 110 of FIG. 1) and identifies a target region and a source region. At step 404, the source region is partitioned into blocks of pixels. In some embodiments, the blocks may have a size of n×n pixels. At step 408, the method 400 defines boundary areas. In some embodiments, the image processing software defines each boundary area using a portion of the source region and a portion of the target region. At step 410, the method 400 examines energy values for the boundary areas. In some embodiments, the image processing software instructs an energy computation module to calculate data costs and smoothness costs for the boundary areas.

Figure 5:
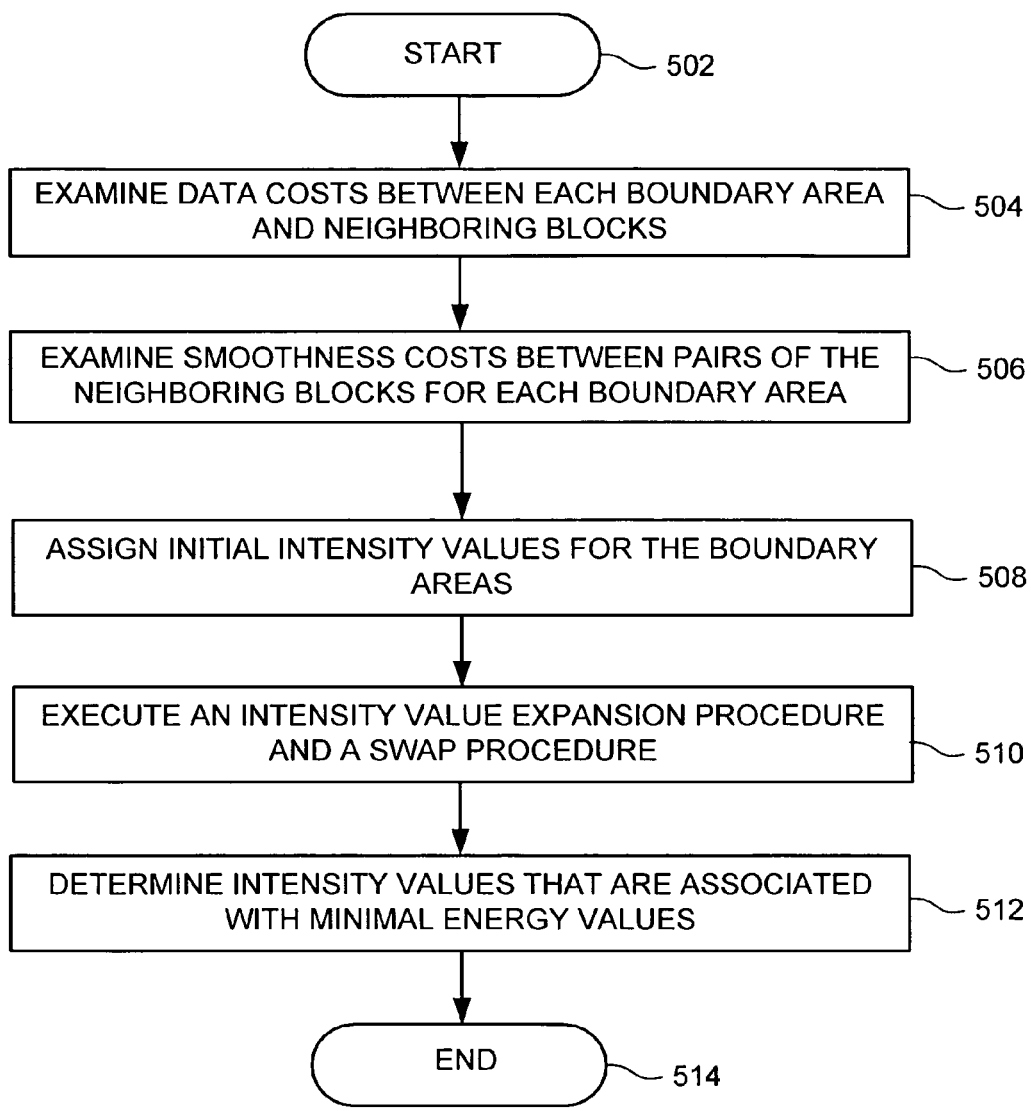
FIG. 5 illustrates a flow chart of a method for assigning labels to boundary areas in accordance with at least one embodiment.

At step 412, the method 400 assigns intensity values to the boundary areas using a graph-cut technique. These intensity values are optimal with respect to the neighboring blocks. In other words, given pixel information (i.e., intensity values for primary color components) from these neighboring blocks, the image processing software determines a most-optimal label assignment for the boundary areas that minimizes a global energy. As shown in FIG. 5, the image processing software performs an initial labeling of intensity values for the source region and the boundary areas. The initial label assignment is determined in response to pixel information at the source region and the boundary areas. Subsequently, the image processing software uses a graph-cut technique to identify neighboring blocks having intensity values that are associated with the minimal global energy. The identified neighboring blocks may be used as candidate patches to perform an in-painting process on the target region of the image.

At step 414, the method 400 stores pixel information for the boundary areas. In some embodiments, the image processing software may generate the pixel information in response to the optimal (i.e., most-optimal) label assignment for the boundary areas. The image processing software may copy portions of the pixel information for the identified neighboring blocks (i.e., the candidate patches) to the pixel information for the boundary areas. In some embodiments, the stored pixel information includes a five component representation of each pixel in the boundary area. As such, the pixel information propagates texture information using at least one of a vertical gradient and a horizontal gradient for each pixel within the image. The vertical gradient and the horizontal gradient represent each pixel as: a product of partial derivative along horizontal direction and normalization of the color information and as a product of partial derivative along vertical direction and a normalization of primary color components, respectively.

At step 416, the method 400 determines whether the target region is completely in-painted. If the method 400 determines that there are more pixels of the target region to be in-painted, the method 400 proceeds to step 418 and repeats steps 408 to 416 until the target region is completely in-painted. At step 418, the method 400 identifies a current target region and a current source region. After in-painting the boundary areas, the target region and the source region decreased and increased, respectively, in size and shape. In some embodiments, the method 400 shifts the image in a particular direction by n pixels where n is arbitrary number and classifies portions of the image as belonging to the current target region or the current source region. For example, the image processing software shifts the image horizontally by a number of pixels (e.g., five pixels). As another example, the image processing software shifts the image vertically or diagonally by the number of pixels. If, on the other hand, the target region is completely in-painted, the method 400 proceeds to step 420. At step 420, the method 400 ends.

FIG. 5 is a flow chart illustrating a method 500 for performing an in-painting process on an image in accordance with the present invention. The method 500 starts at step 502 and proceeds to step 504. Step 504 to step 506 represent an exemplary embodiment of the step 410 of the method 400.

At step 504, the method 500 examines data costs that are computed between each boundary area and neighboring blocks of a source region. In one embodiment, the data cost for each neighboring block to the boundary area is computed as:

$$E_1(x_i) = \sum_{dp \in \left[-\frac{P_m}{2}, \frac{P_m}{2}\right] \times \left[\frac{P_n}{2}, \frac{P_n}{2}\right]} M(p+dp)w_{p,i}G\{I_o(p+dp), I_o(x_i+dp)\} / M_p$$

M( ) is a function (i.e., a Boolean function) that produces one if a current pixel is in a source region and zero if the current pixel is in a target region. $I_o($ ) is a function that outputs a vector representation of pixel information (e.g., the pixel information 114 of FIG. 1) for a particular pixel in an original image, which includes values for primary color components. $X_i$ refers to a center pixel location of $i^{th}$ neighboring block. P refers to a center pixel location at boundary area (i.e., node) p. $W_{p,i}$ represents a weight associated with the $i^{th}$ neighboring node at the boundary area p. G{ } is an auxiliary function that processes two vectors and returns one single intensity value. The following are two examples of this function, but any function capable of processing vectors is applicable:

$$\text{Example 1}: G\{\vec{i_1}, \vec{i_2}\} = \sum_j (\vec{i_{1,j}} - \vec{i_{2,j}})^2$$

$$\text{Example 2}: G\{\vec{i_1}, \vec{i_2}\} = \left(\sum_j (\vec{i_{1,j}} - \vec{i_{2,j}})^p\right)^{1/p}$$

At step 506, the method 500 examines smoothness costs between pairs of the neighboring blocks for each boundary area. In one embodiment, the smoothness cost for each pair of the neighboring blocks ($x_i$ and $x_j$) associated with the boundary area is computed as:

$$E_2(x_i, x_j) = \sum_{\substack{di \in \left[\frac{P_m}{2} - s_m, \frac{P_m}{2}\right] \times \left[-\frac{P_n}{2}, \frac{P_n}{2}\right] \\ di \in [1, s_m] \times \left[-\frac{P_n}{2}, \frac{P_n}{2}\right]}} (I_o(x_i + di) - I_o(x_j + dj))^2$$

Step 508 to step 512 represent an exemplary embodiment of the step 412 of the method 400. At step 508, the method 500 assigns initial intensity values for the boundary areas. In some embodiment, the image processing software assigns initial intensity values onto the source region, the boundary areas and/or the target region. These values may be assigned to homogenous blocks (i.e., nodes) of pixels (e.g., a block of eight by eight pixels). In the target region, nodes are initialized using intensity values of proximate neighboring blocks because the smoothness cost $E_2$ is computed also uses the proximate neighboring blocks. Initial intensity values are selected from those proximate neighboring blocks having a minimum distance to a current node location in the target region. For the source region, each node in the source region has an optimal intensity value derived from a spatial location and pixel information. For each boundary area, the initial intensity value is equal or substantially similar to a minimum data cost ($E_1$) using a weight $w_{\{p,i\}}$.

At step 510, the method 500 executes a label assignment expansion procedure and a label assignment swap procedure. Both use graph-cut to minimize global energy values associated with assigning one or more specific intensity values to one or more boundary areas. At step 512, the method 500 determines intensity values that are associated with minimal energy values. At step 514, the method 500 ends.

Figure 6A:
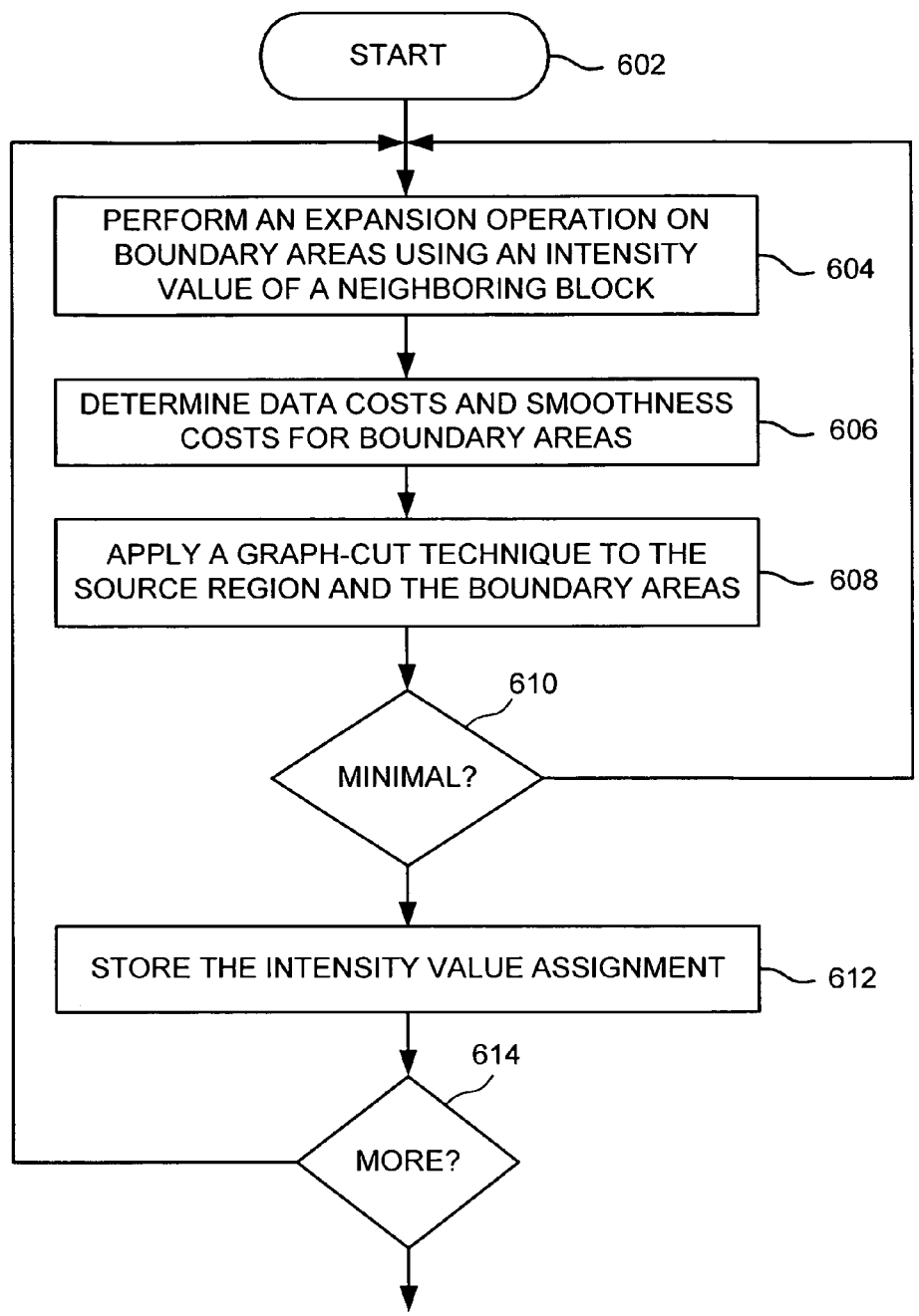
FIGS. 6A-B illustrate a flow diagram of a method for executing a label assignment expansion procedure and a label assignment swap procedure on a source region and boundary areas in an image to be in-painted in accordance with at least one embodiment.
Figure 6B:
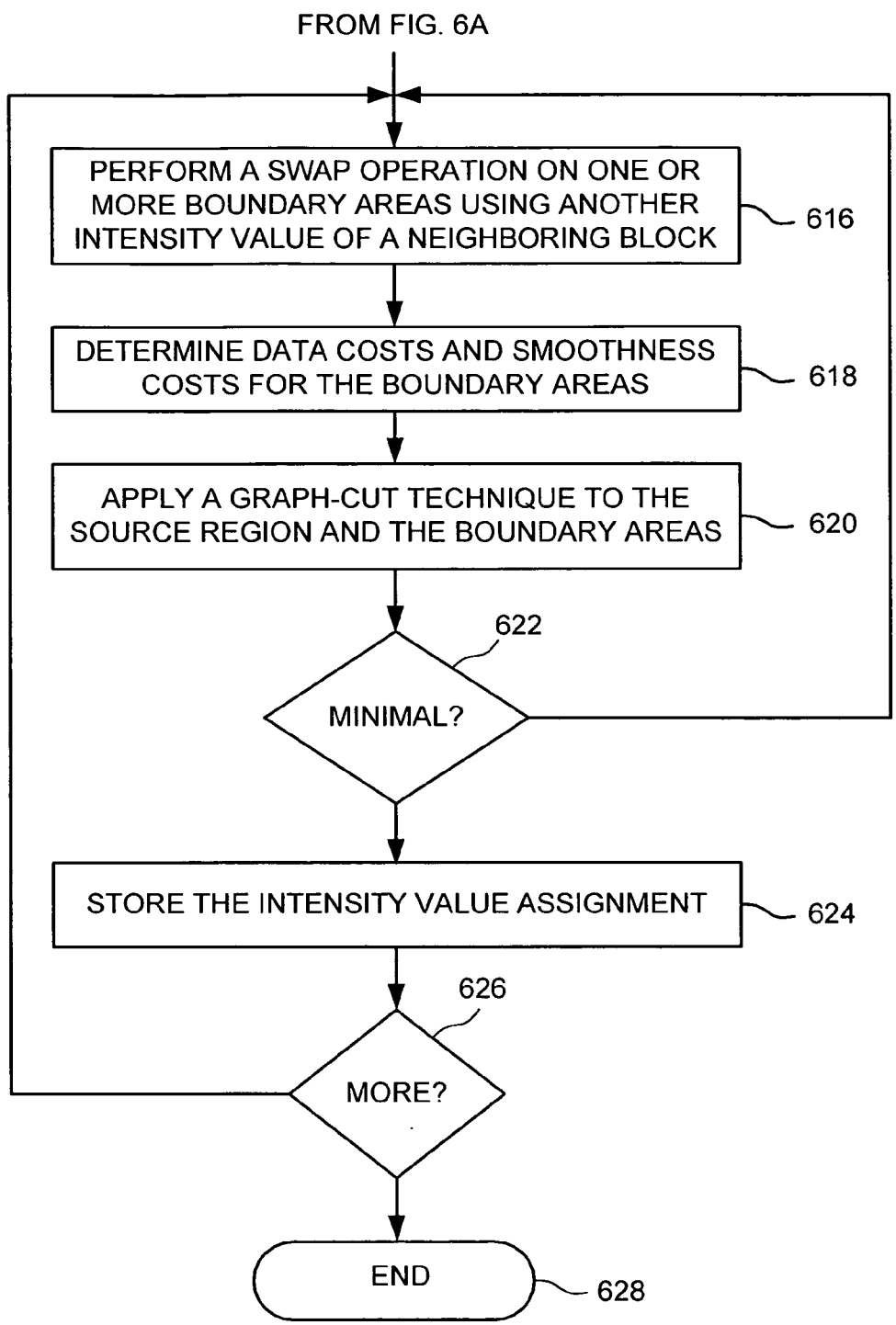

FIGS. 6A-B illustrate a flow diagram of a method 600 for performing a label assignment expansion procedure and a label assignment swap procedure according to one or more embodiments. FIG. 6A depicts the label assignment expansion procedure and FIG. 6B depicts the label assignment swap procedure.

The method 600 starts at step 602 and proceeds to step 604. At step 604, the method 600 performs an expansion operation using an intensity value. At step 606, the method 600 determines data costs and smoothness costs for the boundary areas. At step 608, the method 600 applies a graph-cut technique to the data costs and the smoothness costs for the boundary areas. At step 610, the method 600 determines whether the energy value is a minimal energy value. If the method 600 determines that the energy value is the minimal energy value, the method 600 proceeds to step 612, at which the intensity value is stored. If, on the other hand, the energy value is not the minimal energy value, the method 600 returns to step 604.

After step 612, the method 600 proceeds to step 614. At step 614, the method 600 determines whether there are more possible and/or priority intensity values (e.g., labels). The intensity values are assigned a priority that depends on a distance between a neighboring block and a boundary area. If there more priority intensity values, the method 600 returns to step 604. If, on the other hand, the there are no more priority intensity values, the method 600 proceeds to FIG. 6B.

FIG. 6B depicts a label assignment swap procedure. At step 616, the method 600 performs a swap operation using another intensity value. In some embodiments, the swap operation is performed with the intensity value determined by the expansion operation and the other intensity value. At step 618, the method 600 determines data costs and smoothness costs for the boundary areas. At step 620, the method 600 applies a graph-cut technique to the data costs and the smoothness costs for the boundary areas. At step 622, the method 600 determines whether the energy value is a minimal energy value. If the method 600 determines that the energy value is the minimal energy value, the method 600 proceeds to step 624, at which the intensity value is stored. If, on the other hand, the energy value is not the minimal energy value, the method 600 returns to step 616.

After step 624, the method 600 proceeds to step 626. At step 626, the method 600 determines whether there are more possible and/or priority intensity values (e.g., labels). The intensity values are assigned a priority that depends on a distance between a neighboring block and a boundary area. If there are more priority intensity values, the method 600 returns to step 628. If, on the other hand, the there are no more priority intensity values, the method 600 proceeds to step 630. At step 630, the method 600 ends.

The method 600 selects a neighboring block having pixel information (intensity or luminance) that is associated with a minimum energy value of a boundary area. For example, during an expansion operation, some of the boundary areas will have their initial label assignment change to another intensity value if the pixels for the matching neighboring block would result in minimal global energy values. Use pixel information from a possible matching block (starting with most similar neighboring block) to perform the in-painting process on the image. For example, such pixel information is used to restore deleted or damaged target regions. If a new label reduces the energy from the initial label, the new label is assigned to the boundary area.

Embodiments of the present invention provide minimal error propagation while performing an in-painting process. Multiple boundary areas (i.e., blocks of pixels within a boundary between a source region and a target region) are in-painted together instead of one block at a time, which enables visual association or segmentation of blocks with either a background or a foreground.

While, the present invention is described in connection with the preferred embodiments of the various figures. It is to be understood that other similar embodiments may be used. Modifications/additions may be made to the described embodiments for performing the same function of the present invention without deviating therefore. Therefore, the present invention should not be limited to any single embodiment, but rather construed in breadth and scope in accordance with the recitation of the appended claims.

The invention claimed is:

1. A method of in-painting an image using prioritized graph cut optimization, comprising:
    accessing an image comprising a plurality of pixels that form a source region and a target region, wherein the source region comprises pixel information;
    partitioning the source region into blocks;
    defining a plurality of boundary areas comprising a portion of the source region and a portion of the target region;
    examining a plurality of energy values for the source region and the boundary areas, wherein energy values represent intensity comparisons between the boundary areas and neighboring blocks of the source region; and
    assigning labels to the boundary areas using a graph-cut technique, wherein each label is associated with a neighboring block and an minimal energy value for each boundary area; and
    storing pixel information for the boundary areas based on the pixel information of the neighboring blocks associated with the minimal energy values.

2. The method of claim 1, wherein partitioning the source region further comprises propagating a plurality of texture values using at least one of a vertical gradient and a horizontal gradient for each pixel within the image.

3. The method of claim 2, wherein using at least one of a vertical gradient and a horizontal gradient further comprises representing each pixel as: a product of a partial derivative along a horizontal direction and normalization of primary color components of a pixel and as a product of a partial derivative along a vertical direction and a normalization of the primary color components of the pixel.

4. The method of claim 1, wherein the neighboring blocks are prioritized based on a distance from the boundary areas.

5. The method of claim 1, wherein examining a plurality of energy values for the source region and the boundary areas further comprising:
    examining a data cost between a boundary area and at least one neighboring block; and
    examining a smoothness cost associated with at least two neighboring blocks for the boundary area.

6. The method of claim 5 further comprising selecting an intensity value for the each boundary area based on the data cost and the smoothness cost that correspond with the at least one neighboring blocks.

7. The method of claim 1, wherein assigning the labels further comprises executing a label assignment expansion procedure and a label assignment swap procedure on the boundary areas using intensity values from the neighboring blocks.

8. The method of claim 1, wherein assigning the labels further comprising perform a label assignment expansion procedure to modify an initial label assignment of the boundary areas using intensity values of the neighboring nodes that are associated with the minimal energy values.

9. The method of claim 1, wherein assigning the labels further comprising perform a label assignment swap procedure to identify the intensity values that are associated with the minimal energy values.

10. The method of claim 1 further comprising repeating the defining step, the examining step, the assigning step and the storing step until the target region is completely in-painted.

11. The method of claim 1, wherein assigning the intensity values further comprises determining an optimal label assignment for the boundary areas wherein the each boundary area is assigned at least one label from at least one neighboring block, wherein the at least one assigned label is associated with a minimal global energy for the image.

12. The method of claim 1 further comprising identifying a current source region and a current target region.

13. An apparatus for in-painting an image using prioritized graph cut optimization, comprising:
an image processor for examining an image comprising a plurality of pixels that form a source region and a target region, wherein the source region is partitioned into blocks that comprise pixel information and defining a plurality of boundary areas comprising a portion of the source region and a portion of the target region; and
an energy computation module for examining a plurality of energy values for the source region and the boundary areas, wherein energy values represent intensity comparisons between the boundary areas and neighboring blocks of the source region, assigning labels to the boundary areas using a graph-cut technique, wherein each label is associated with a neighboring block and an minimal energy value for each boundary area and storing pixel information for the boundary areas based on the pixel information of the neighboring blocks associated with the minimal energy values.

14. The apparatus of claim 13 further comprising a energy computation module for computing a data cost between a boundary area and at least one neighboring block and computing a smoothness cost associated with at least two neighboring blocks for the boundary area.

15. The apparatus of claim 13 further comprising a graph-cut module for applying the graph-cut technique to the image and identifying at least one of the neighboring blocks having a label that is associated with minimal energy values.

16. The apparatus of claim 13, wherein the pixel information comprises color information, a product of partial derivative along an horizontal direction and a normalization factor of the color information and a product of partial derivative along vertical direction and the normalization factor of the color information.

17. A non-transitory computer readable storage medium storing thereon one or more processor executable instructions that, when executed by at least one processor, causes the at least one processor to perform a method comprising:
examining an image comprising a plurality of pixels that form a source region and a target region, wherein the source region comprises pixel information;
partitioning the source region into blocks;
defining a plurality of boundary areas comprising a portion of the source region and a portion of the target region;
computing a plurality of energy values for the source region and the boundary areas, wherein energy values represent intensity comparisons between the boundary areas and neighboring blocks of the source region; and
assigning labels to the boundary areas using a graph-cut technique, wherein each label is associated with a neighboring block and an minimal energy value for each boundary area; and
storing pixel information for the boundary areas based on the pixel information of the neighboring blocks associated with the minimal energy values.

18. The computer-readable-storage medium of claim 17, wherein the one or more processor executable instructions perform the method further comprising alternating execution of a label assignment expansion procedure and a label assignment swap procedure on the boundary areas using intensity values from the neighboring blocks.

19. The computer-readable-storage medium of claim 17, wherein the one or more processor executable instructions perform the method further comprising selecting an intensity value for the each boundary area based on a data cost and a smoothness cost that correspond with the at least one neighboring blocks.

20. The computer-readable-storage medium of claim 17, wherein the one or more processor executable instructions perform the method further comprising repeating the defining step, the examining step, the assigning step and the storing step until the target region is completely in-painted.

* * * * *